United States Patent
Busey et al.

(10) Patent No.: US 12,183,067 B2
(45) Date of Patent: Dec. 31, 2024

(54) VOLUMETRIC BASELINE IMAGE GENERATION AND OBJECT IDENTIFICATION

(71) Applicant: Hypergiant Industries, Inc., Austin, TX (US)

(72) Inventors: Andrew Thomas Busey, Austin, TX (US); Benjamin Edward Lamm, Dallas, TX (US)

(*) Notice: Subject to any disclaimer, the term of this patent is extended or adjusted under 35 U.S.C. 154(b) by 684 days.

(21) Appl. No.: 17/314,764

(22) Filed: May 7, 2021

(65) Prior Publication Data
US 2022/0351507 A1    Nov. 3, 2022

Related U.S. Application Data

(60) Provisional application No. 63/021,475, filed on May 7, 2020.

(51) Int. Cl.
| | |
|---|---|
| G06K 9/00 | (2022.01) |
| G06T 15/04 | (2011.01) |
| G06T 17/05 | (2011.01) |
| G06T 19/20 | (2011.01) |
| G06V 20/10 | (2022.01) |

(52) U.S. Cl.
CPC .............. *G06V 20/10* (2022.01); *G06T 15/04* (2013.01); *G06T 17/05* (2013.01); *G06T 19/20* (2013.01)

(58) Field of Classification Search
CPC ......... G06V 20/10; G06T 15/04; G06T 17/05; G06T 19/20; G01S 13/003; G01S 13/89; G06F 2218/08; G06F 2218/12
See application file for complete search history.

(56) References Cited

U.S. PATENT DOCUMENTS

| | | | | |
|---|---|---|---|---|
| 5,673,050 A | * | 9/1997 | Moussally | G01S 13/0209 |
| | | | | 342/25 F |
| 5,960,097 A | * | 9/1999 | Pfeiffer | G06V 10/255 |
| | | | | 342/357.65 |

(Continued)

FOREIGN PATENT DOCUMENTS

| | | | | |
|---|---|---|---|---|
| CN | 103049655 B | * | 7/2014 | ............. G06Q 50/02 |
| GB | 2588556 A | * | 4/2021 | ............. G06F 16/00 |
| WO | WO-2020086685 A1 | * | 4/2020 | ............ G06K 9/0063 |

*Primary Examiner* — Shervin K Nakhjavan
(74) *Attorney, Agent, or Firm* — Kowert, Hood, Munyon, Rankin & Goetzel, P.C.

(57) ABSTRACT

A system for generating a three-dimensional map of earth's surface and identification of objects is disclosed. The system is configured to receive data, from one or more collectors, comprising three-dimensional data generated from radio frequency signals reflected from earth's surface. The system is further configured to generate an initial version of a baseline three-dimensional map of earth's surface, wherein generating the three-dimensional map includes determining, based on the surface data, a presence of surface features in the earth's surface. Anomalies may be detected based on a comparison of subsequently received data and the baseline, with the system determining that a first anomaly matches an object having an object type. Based on this determination, the system may create a data structure indicating an object type and a geographic location of the matched object, wherein the geographic location data is usable to track the matched object during an analysis period.

20 Claims, 5 Drawing Sheets

(56) References Cited

U.S. PATENT DOCUMENTS

| | | | | |
|---|---|---|---|---|
| 6,252,538 B1* | 6/2001 | Chignell | G01S 13/0209 | 342/195 |
| 6,590,519 B2* | 7/2003 | Miceli | G01S 13/89 | 701/472 |
| 6,859,416 B2* | 2/2005 | Inubushi | G01V 1/01 | 702/14 |
| 7,277,797 B1* | 10/2007 | Kunitsyn | G01V 1/01 | 702/15 |
| 8,144,245 B2* | 3/2012 | Vik | E21C 41/26 | 348/425.2 |
| 8,280,634 B2* | 10/2012 | Young | G01V 11/002 | 342/22 |
| 9,928,553 B1* | 3/2018 | Harvey | G06Q 40/08 | |
| 10,042,048 B1* | 8/2018 | Moya | G01S 13/9023 | |
| 10,145,972 B2* | 12/2018 | Owen | G01V 1/288 | |
| 10,721,461 B2* | 7/2020 | Brockers | B64U 20/87 | |
| 11,068,737 B2 | 7/2021 | Kumar | | |
| 11,074,445 B2 | 7/2021 | Li | | |
| 11,080,526 B2 | 8/2021 | Khandelwal et al. | | |
| 11,417,057 B2* | 8/2022 | Atsmon | G01C 21/3815 | |
| 11,544,161 B1* | 1/2023 | Yarlagadda | G01D 3/08 | |
| 11,656,353 B2* | 5/2023 | Li | G01S 7/417 | 342/25 F |
| 11,714,189 B2* | 8/2023 | Padmanabhan | G01S 13/9027 | 342/22 |
| 2009/0102711 A1* | 4/2009 | Elwell, Jr. | G01S 5/02527 | 342/450 |
| 2011/0037639 A1* | 2/2011 | Duran Toro | G01S 13/89 | 342/22 |
| 2014/0163885 A1* | 6/2014 | Clar | G06F 15/00 | 702/5 |
| 2014/0245165 A1* | 8/2014 | Battcher | G06Q 40/08 | 715/738 |
| 2016/0217578 A1* | 7/2016 | Can | G08C 23/04 | |
| 2019/0033476 A1* | 1/2019 | O'Malley | G06F 17/17 | |
| 2019/0064362 A1* | 2/2019 | Scott | G01S 13/865 | |
| 2021/0180981 A1* | 6/2021 | Matsumoto | H04W 4/44 | |
| 2022/0012942 A1* | 1/2022 | Hu | G06T 5/005 | |

* cited by examiner

VOLUMETRIC BASELINE IMAGE GENERATION AND OBJECT IDENTIFICATION

PRIORITY

This application claims priority to U.S. Provisional Patent Application 63/021,475, filed May 7, 2020, the disclosure of which is incorporated by reference herein in its entirety.

BACKGROUND

Technical Field

This disclosure is directed to generating images, and more particularly, the generation of volumetric maps of a surface and identification of objects thereon.

Description of the Related Art

Generation of three-dimensional maps of the earth's surface can provide a significant amount of useful data. Various techniques can be used to generate these maps. These techniques include traditional methods, such as surveying, but can also include techniques that use airborne or spaceborne data gathering mechanisms. For example, satellites transmitting and receiving radar signals may gather data that can be further processed to generate three-dimensional maps.

SUMMARY

The present disclosure is directed to the generation of a three-dimensional map of earth's surface and identification of objects thereon. In one embodiment, a system is configured to receive earth's surface data from one or more collectors, the earth's surface data comprising three-dimensional data generated from radio frequency signals reflected from earth's surface. The system is further configured to generate an initial version of a baseline three-dimensional map of earth's surface, wherein generating the three-dimensional map includes determining, based on the surface data, a presence of surface features in the earth's surface. The system may further detect a presence of one or more anomalies in the baseline by comparing the baseline to subsequently received data. The system may also determine that a first anomaly matches an object having an object type. Based on this determination, the system may create a data structure indicating an object type and a geographic location of the matched object, wherein the geographic location data is usable to track the matched object during an analysis period.

In one embodiment, the system is configured to determine the object type by matching the object to an item in a library having a plurality of objects. The system may also generate a confidence metric indicative of a degree of confidence that the classification is correct. In the event that the object moves over time, the system may track the movement. Various embodiments of the system are configured to detect shifting landscape in the data, and may also detect hidden objects within the shifting landscapes.

BRIEF DESCRIPTION OF THE DRAWINGS

The following detailed description makes reference to the accompanying drawings, which are now briefly described.

DETAILED DESCRIPTION OF EMBODIMENTS

The present disclosure contemplates various embodiments for generating a baseline of earth's surface using data gathered from various types of collectors. In one embodiment, the collectors include satellites in earth orbit. The collectors may receive reflections of, e.g., radio frequency signals, from earth's surface. The collected data is then relayed to a computer system, where it is utilized to generate a three-dimensional map that serves as baseline. Data may be subsequently collected and received by the computer system, where anomalies may be detected if present. The anomalies may include shifting landscapes from either natural or man-made causes, and may further include objects such as buildings, vehicles, and so on. The anomalies may be detected through a comparison between the baseline and the subsequently received data.

The anomalies may, in some cases, be identified as particular objects based on various data, such as data of the anomaly's dimensions. An object library having a number of entries each corresponding to a particular object type may be used along with the dimensions of the anomaly to determine its particular type. In some instances, such as when the object is identified as a vehicle, movement of the object may be tracked over time.

The data gathering may be further augmented using aerial vehicles (e.g., drones) to further update the data and aid in tracking the movement of objects. The baseline may be update from time to time, when, for example, natural causes alter the landscape or a new building is constructed.

Further details will now be provided. The discussion begins with a basic embodiment of the system disclosed herein. Discussions directed to the generation of a baseline and volumetric identification of objects follow. Thereafter, a method for performing baseline generation and volumetric detection is discussed. The specification concludes with an example embodiment of a computer system having a non-transitory computer readable medium which may be used to carry out the operations discussed herein.

Figure 1:
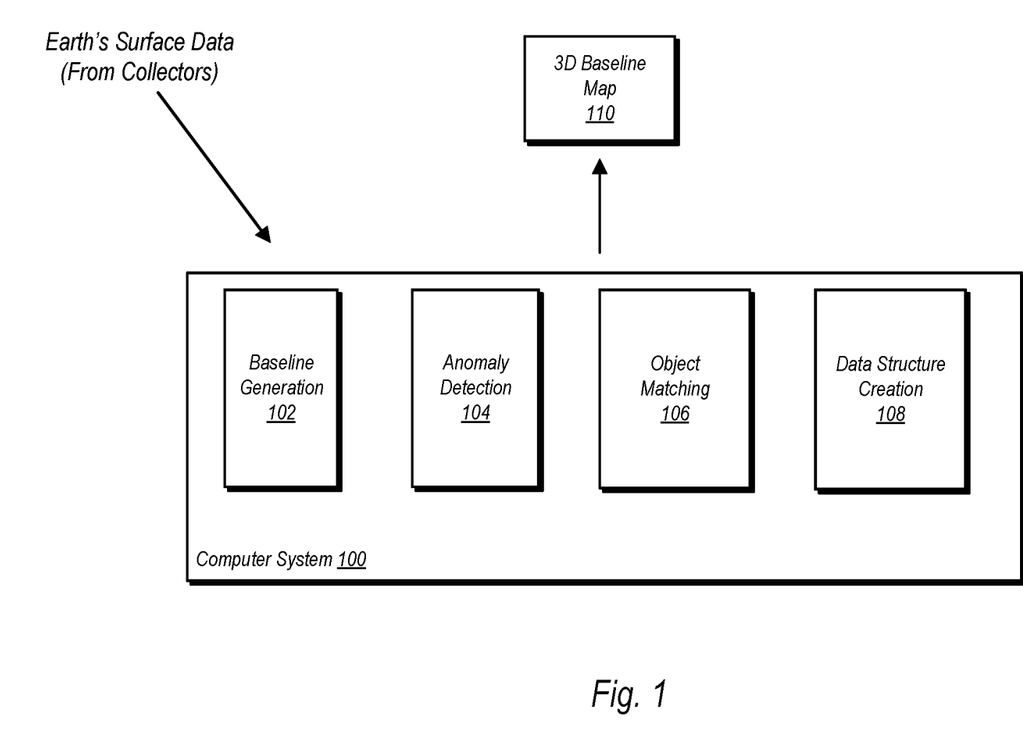
FIG. 1 is a block diagram of one embodiment of a computer system configured to generate a baseline and perform volumetric object detection.

System for Baseline Generation and Volumetric Identification:

FIG. 1 is a block diagram of one embodiment of a computer system usable to generate a baseline three-dimensional map of earth's surface and further perform object identification using volumetric data. In the embodiment shown, computer system 100 includes a baseline generation module, an anomaly detection module, an object matching module, and a data structure creation module. These various modules may be implemented in other forms, e.g., in the various module combinations discussed below in reference to FIGS. 2 and 3. Computer system 100 may output a three-dimensional baseline map 110, and may also output information regarding detected objects, objects for which the movement is tracked over time, shifting landscapes, and so on.

In the embodiment shown, computer system 100 is arranged to receive earth's surface data from one or more collectors, wherein the earth's surface data comprises three-dimensional data generated from radio frequency signals reflected from earth's surface. The collectors may include one or more satellites and/or one or more aerial vehicles. Using this data, baseline generation module 102 may generate an initial version of a baseline three-dimensional map of earth's surface. Generating the three-dimensional map includes determining, based on the surface data, a presence of various surface features in the earth's surface. Such surface features may include both natural landscape features, as well as man-made features. The data used to generate the baseline map 110 may be updated from time to time (e.g., on a periodic basis). Comparisons to a previous set of data may be used to detect objects, changes to the landscape (e.g., due to natural disasters), and to update the baseline.

An anomaly detection module 104 may be used to determine a presence of one or more anomalies based on a comparison of the baseline to subsequently received data. The anomalies may represent changes from the previous baseline. For example, the construction of a new building may result in the detection of an anomaly relative to a previous baseline, as can a natural disaster that alters the landscape.

An object matching module 106 is implemented to determine that a first anomaly of the one or more anomalies matches an object having an object type. In various embodiments, the object matching module may utilize dimensional data of a detected anomaly and a library of objects. The library of objects may include a number of entries of various types of objects, such as vehicles, buildings and so on. If the dimensions are a close enough match to an object in the library, object matching module 106 may classify the anomaly as being an instance of the object. The classification may be further refined as additional data is received, and confidence metrics may also be generated indicating a level of confidence in the classification.

Data structure creation module 108 in the embodiment shown is configured to create a data structure, in response to determining that the anomaly matches an object type, that indicates the object type and a geographic location of the matched object. The geographic location data is usable to track the matched object during an analysis period. Accordingly, if the matched object is a vehicle or is otherwise moved, the movement may be tracked with the data structure being updated accordingly. Additional machine learning functions may be utilized to, e.g., determine the patterns of movement when an object moves, and may help in generation of the confidence metric discussed above.

Figure 2:
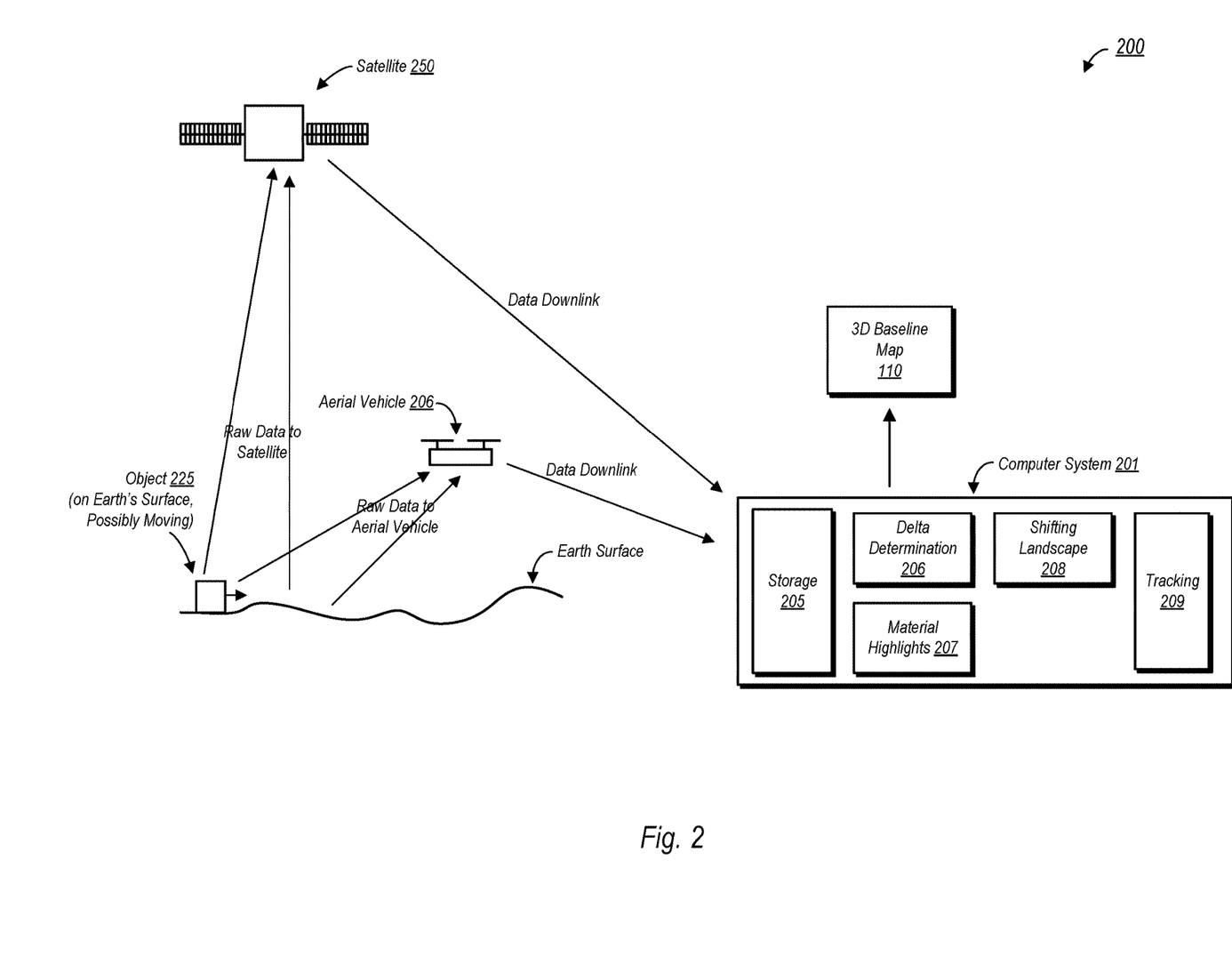
FIG. 2 is a block diagram of one embodiment of a system configured to generate a baseline three-dimensional map of earth's surface.
Figure 3:
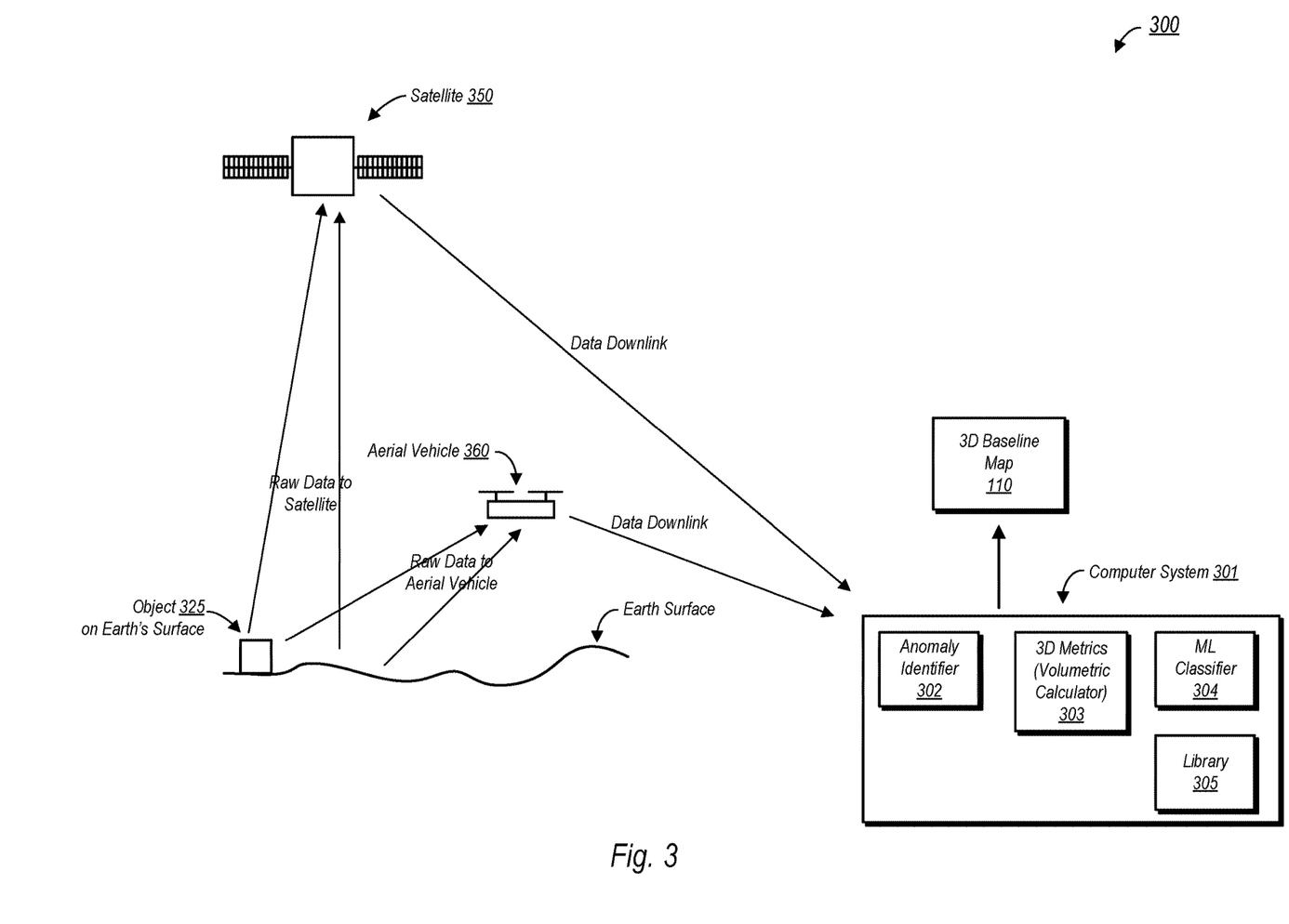
FIG. 3 is a block diagram of one embodiment of a system configured to perform volumetric detection of anomalies from a baseline three-dimensional map.

As noted above, the various modules may be implemented in different ways. FIGS. 2 and 3 illustrate embodiments of a computer system that may carry out various ones of the functions discussed in reference to FIG. 1, and are now discussed in further detail.

Generation of a Baseline:

FIG. 2 illustrates various components of one embodiment of a system 200 from which a baseline of earth's surface may be generated. As shown in FIG. 2, one or more satellites 250 orbiting earth may receive reflections of radio frequency (RF) signals originally transmitted downward towards earth's surface. From these reflections, the satellites 250 may generate raw data that can be transmitted to computer system 201. Since man-made objects (such as object 225) may also be present on the earth's surface, reflection of RF signals off of these objects may be included in the raw data that is transmitted via a downlink to the computer system 201.

The gathering of raw data may also be performed by one or more aerial vehicles 260, either as an alternative to the satellite 250 or as an augmentation thereto. In this particular example, a drone is used to gather raw data, although any type of aerial vehicle may be used, including airplanes, helicopters, and so on. Hybrid data gathering utilizing satellites and aerial vehicles is discussed in further detail below.

The baseline map 110 of earth's surface may be generated after one or more satellites 250 (which may be part of a constellation of satellites 250) make at least one pass around earth. The earth baseline map 110 may be comprised of image data of earth's surfaces, objects on or above earth's surfaces, objects under water (and other radar transparent surfaces such as tress, etc.) as well as objects that are under overhangs and other structures if there are sufficient satellite passes comprising sufficient imaging angles to partially image under overhangs, roofs, and other structures. Data may be continued to be received after the initial generation of baseline map 110 to determine the presence of anomalies as well as to make updates to the baseline due to factors such as natural changes in the landscape, construction of new buildings and other structures, and so on.

The raw data gathered by the satellites 250 and/or aerial vehicles 260 may be transmitted via downlink(s) to the computer system 201 shown in FIG. 1. This raw data is then processed to carry out generation of the earth baseline map 110. In particular, computer system 201 may generate a high-resolution three-dimensional map of the earth's surface. The computer system 201 may implement various modules that carry out these functions. The raw data may initially be received in a storage unit 205 for access by the other modules in the illustrated computer system 100. The modules shown here include a delta determination module 206, a material highlights module, 207 a shifting landscapes module 208, and a tracking module 209. In various embodiments, the computer system 201 here may work in conjunction with a system that performs volumetric analysis of object on the earth's surface, as discussed below. Alternatively, the functions of this computer system and that discussed below may be combined.

The delta determination module 206 in the embodiment shown is used to determine various information regarding changes in the landscape based on comparisons of data received at different points in time (e.g., initial data used for a baseline and subsequent data). The changes can be variations in the landscape due to various features thereof, and may include dimensional data. Relative to an established baseline, the changes detected by the delta determination module 206 may include dimensional changes, changes in the location of an object, and so on. Among the uses of the information generated by the delta determination module can be the tracking of the object (as discussed further below).

The material highlights module 207 shown in FIG. 2 may identify objects that are under radar transparent materials and/or highly dependent on material differentiation capability. Some of the RF signals received by the detectors (if not also transmitted thereby) have the characteristic of being able to partially penetrate certain radar transparent materials (such as water, trees, etc.) that are at least partially radar transparent. In one embodiment, the earth baseline map 110 may be comprised of base topographic data for a certain type of surfaces (e.g., a water surface) enriched by additional data such as objects under water (to a certain depth) or objects under trees. The material highlights module 207 leverages this information to identify objects that are underwater or under partially an RF or radar transparent material. The material highlights module 207 may also be used to spot changes underneath these items. The radar signals that are reflected from earth surfaces may be amplified or absorbed by certain material that may be reflective or light absorbent. Those items may be specifically tagged by the material highlights module to identify objects and track their movement within a volumetric three dimensional map.

The shifting landscape module 208 in the embodiment shown detects when a topographical surface is shifting. This module may receive information from the delta determination module 206. The shifting may be detected as occurring continuously or semi-continuously. For example, oceans or other liquid masses, deserts and other landmasses that change based on weather patterns or other conditions may be identified as such by the shifting landscape module 208. In one embodiment, the shifting landscape module 208 identifies such masses based on the number of changes detected over a unit of time. The shifting landscape module marks shifting landmasses and seascapes as such within the three-dimensional map. This information may also be made available to an identification module (e.g., anomaly identifier 302, shown in FIG. 3 and discussed below) such that the identification module may identify vehicles and/or other objects that may be present but otherwise hidden under surfaces (such as submarines), on surfaces (such as boats and land based vehicles), and over surfaces (such as various aircraft). In some embodiment, detection of shifting surfaces may be based on a number of changes to the surface exceeding one or more thresholds over one or more analysis periods. These, shifting landscapes may, in some instances, may be tagged and disregarded, e.g., when they do not yield useful information regarding particular objects.

The tracking module 209 may track the movement of objects, particularly vehicles, over time. In the embodiment shown, object 225 is an object detected by computer system 201, and if this object is moving, the movement may be tracked by tracking module 209. In embodiments of the system 200 having a number of collectors, data may be updated with a frequency that enables real-time or near real-time tracking of the movement of object 225 within a three-dimensional space. For example, object 225, when identified as a truck, may have its movement between particular locations tracked over time as additional raw data is received from the various collectors and processed by the computer system 201. The tracking module 209 may tag a tracked object with known geospatial data, and may further indicate a path of the object as it moves over time. As the baseline map is refreshed over time and/or as new variances are detected, the tracking module 209 may determine whether the new variance has the same volumetric dimensions as the tagged object. If so, the tracking module may compute an expected path through baseline map 110 and continually track the tagged object as subsequent data is received.

In tracking the movement of objects, the tracking module 209 may receive data from the delta determination module 206 and the shifting landscapes module 208. Data received from the latter indicative of shifting landscapes may be disregarded in at least some instances. This may aid the tracking module 209 in distinguishing the movement of objects, based on data received from the delta determination module, from shifting landscapes.

Volumetric Identification:

Using the baseline map 110 discussed above, additional volumetric analysis may be performed, as well as the identification of objects on the earth's surface. FIG. 3 illustrates a system 300 that may perform the detection, classification, and tracking of objects on the earth's surface using volumetric identification. In various embodiments, the system shown in FIG. 3 may incorporate the features discussed above in reference to FIG. 2, and may further include those additional features shown here. Thus, the present disclosure includes various systems and methods for analyzing volumetric three-dimensional data that is obtained from reflected RF/radar data to identify objects that may be present in a volumetric three-dimensional space. Any combination of the various modules shown in FIGS. 1-3, and variations thereof, are contemplated to fall within the scope of this disclosure. Furthermore, the present disclosure contemplates the use of machine learning systems to identify objects. The systems and methods disclosed herein enable objects to be identified and/or tracked as they traverse a volumetric three-dimensional space.

As with the system in FIG. 2, system 300 of FIG. 3 may utilize data received via downlinks from one or more collectors, including satellites 350 and/or aerial vehicles 360. The data may be, e.g., data generated from the reflection of RF signals off of the earth's surface, which may be used to detect the general topography of the landscape as well as objects present thereon. In one embodiment, the computer system 300 shown in FIG. 3 may either include those modules shown in the computer system of FIGS. 1 and 2, or otherwise be a computer system coupled thereto. Accordingly, the computer system of FIG. 3 may receive information regarding a baseline of earth's surface, as well as information regarding variances to the baseline and the tracking of movement of such variances that may be determined to be objects.

The modules implemented in the computer system of FIG. 3 may, collectively identify anomalies for further analysis, calculating volumetric information regarding the anomalies, and classifying the anomalies. As noted above, the information used to perform these functions may be partly based on information received from the various processing functions performed in the computer system of FIGS. 1 and/or 2, as well as additional information generated by the processing in the computer system of FIG. 3.

The anomaly identifier 302 may be used to determine the presence of anomalies in the various landscape features, and may provide further information indicating that detected anomalies bear further observation and classification. Some anomalies may be naturally occurring landscape features that have undergone recent changes, due to various factors such as weather, natural disasters, and so on. The identified anomalies may also include man-made features, such as buildings, vehicles, and the like.

The anomaly identifier 302 may also determine the presence of objects in a particular location where they were not previously present as additional data is received over time. This may include determining the presence of newly constructed buildings on a portion of land where none were present in previous versions of the baseline map 110. The anomaly identifier 302 may determine the presence of variations in the baseline map 302 that correspond to objects, such as vehicles (cars, tanks, boats, submarines, etc.), humans, physical structures, etc.

The 3D metrics module 303 (or volumetric calculator) may generate volumetric calculations of anomalies identified by the anomaly identifier 302. The calculations may be based on data received from anomaly identifier 302 that indicates a location of the anomaly as well as more specific location data regarding the various contours of an identified anomaly. The data used in performing the volumetric calculations may include data from both satellites 350 and aerial vehicles 360 initially provided to the anomaly identifier. Using the information received from the anomaly identifier 302, the 3D metrics module 303 may calculate such dimensions as height, length, width, depth, and overall volume of the anomaly.

The machine learning (ML) classifier module 304 in the embodiment shown may apply various machine learning techniques to information received form the 3D metrics module 303 to perform classification of anomalies, and may also generate confidence metrics regarding a particular classification. Using the information received from the 3D metrics module 303, the ML classifier module 304 may identify an object based on its volumetric dimensions. Generally, various volumetric dimensions may correspond to various objects within a volumetric three-dimensional map. For example, a volumetric dimension of 1×1×3 $m^3$ may correspond to a human. A volumetric dimension of 2×2×5 $m^3$ may be a car. Very large volumetric changes could indicate things such as new construction, natural disasters, ships, and so on. A variety of different identification techniques may be used without departing from the scope of the disclosure, including, but not limited to lookup systems in a database, machine learning systems, etc.

In the embodiment shown in FIG. 3, a library 305 of objects may be accessed by the ML classifier. For example, the ML classifier 304 may, based on the dimensions for a detected anomaly, find objects in the library 305 that approximate or match its dimensions. The library of objects may include a number of entries each corresponding to a particular object type (e.g., car, truck, aircraft, tank, etc.). In some embodiments, an entry may include additional information, such as make and model for a particular object that enables it to be distinguished from other objects of the same type. The ML classifier 304 may use various calculated dimensions of a given object to match it with an entry in the library. The availability of high-resolution data may allow for further classification of an object, e.g., with respect to make and model type as discussed above.

The ML classifier may use various machine learning techniques, along with various parameters (e.g., dimensions of an anomaly, amplitude of signal reflections corresponding to the anomaly and so on) to determine the confidence in the classification of a particular anomaly. In one embodiment, the ML classifier may use a technique known as logistic regression classification. However, any suitable machine learning technique may be used to generate a confidence in a particular classification, or the identity of a particular object/anomaly.

Generally speaking, the ML classifier 304 may be used to identify an object based on a variance having certain volumetric dimensions. The machine learning techniques performed by the ML classifier may include supervised and/or unsupervised and trained on a training dataset comprising a variety of objects having a variety of different identification tags. In one embodiment, granular data may be used to identify things such as car, ship, tank, and even the make and manufacture of cars, ships, tanks, etc., which may include using the library in the computer system.

In addition to performing a classification of a given anomaly, the ML classifier 304 may generate a confidence metric indicative of a level of confidence in the particular classification. In one possible embodiment, for a given anomaly type, ML classifier 304 may output a confidence metric that has a value on a continuum between 0 and 1. A value of 1 for a given anomaly may indicate a very high degree of confidence that the anomaly has been properly classified. For example, ML classifier 304 may output a 1 when it a high degree of confidence exists that a particular anomaly, as preliminarily classified by the anomaly identifier 302, is a building. On the other hand, if the ML classifier 304 outputs a 0 for a particular type of anomaly, it has little or no confidence in the initial classification performed by the anomaly identifier 302.

Various factors may play into the calculation of a confidence metric for a given object. For example, a certain set of dimensions may be indicative of an automobile or a small boat. Accordingly, location of the corresponding anomaly may be used as part of the generation of the confidence metric. If the location of the anomaly corresponds to a given landmass in the given example, the ML classifier 304 may indicate a greater degree of confidence that the anomaly corresponds to an automobile. Conversely, if the location of the anomaly is on a body of water in the given example, the ML classifier 304 may indicate a greater degree of confidence that the anomaly is a small boat.

In various embodiment, the ML classifier 304 may also receive information from the tracking module 209 shown in the computer system of FIG. 2. Information from the tracking module 209 may be used by the ML classifier 304 to determine if a pattern of movement of a particular object is consistent with a certain classification. For example, an anomaly having dimensions of an automobile that has also been tracked as moving at a speed in in movement patterns consistent with that of an automobile may be classified as an automobile with a high degree of confidence. Similarly, the locations over which an anomaly moves may aid in assigning a confidence metric to its classification as a particular type of object.

Figure 4:
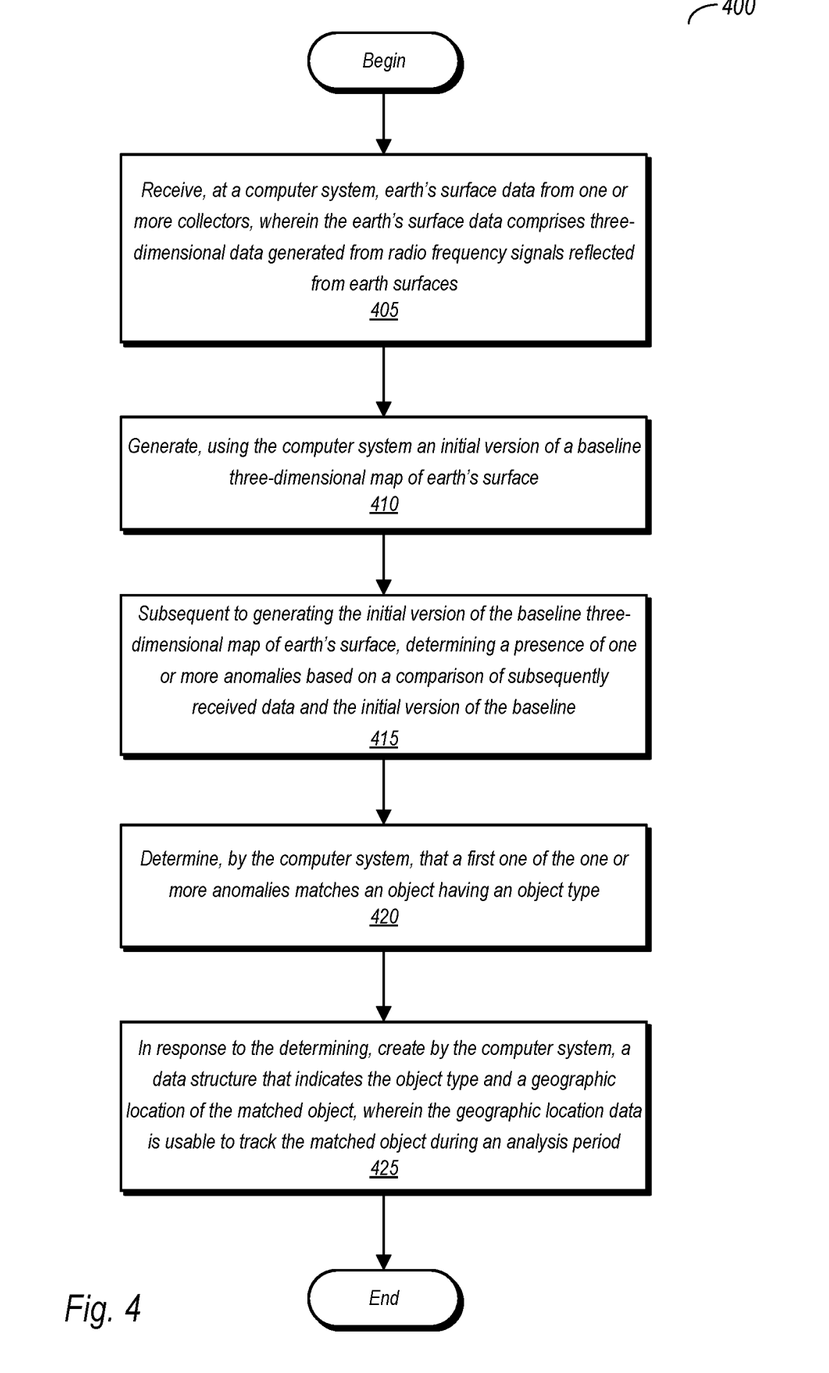
FIG. 4 is a flow diagram of one embodiment of a method for generating a baseline and performing volumetric detection.

Method Flow:

FIG. 4 is a flow diagram of one embodiment of a method for generating a baseline and performing volumetric detection. Method 400 as shown herein may be carried out by any of the system embodiments discussed above with reference to FIGS. 1-3, and various combinations thereof. Embodiments of a system capable of carrying out method 400 but not otherwise disclosed explicitly herein may also be considered to fall within the scope of this disclosure.

Method 400 includes receiving, at a computer system, earth's surface data from one or more collectors, wherein the earth's surface data comprises three-dimensional data generated from radio frequency signals reflected from earth surfaces (block 405). The method further includes generating, using the computer system an initial version of a baseline three-dimensional map of earth's surface (block 410). Subsequent to generating the initial version of the baseline three-dimensional map of earth's surface, the method includes determining a presence of one or more anomalies based on a comparison of subsequently received data and the initial version of the baseline (block 415). Thereafter, the computer system determines that a first one of the one or more anomalies matches an object having an object type (block 420). In response to determining that the first one of the anomalies matches an object, the method includes creating by the computer system, a data structure that indicates the object type and a geographic location of the matched object, wherein the geographic location data is usable to track the matched object during an analysis period (block 425).

In various embodiments, the method includes determining the object type of the object by matching the data with an entry in an object library having a plurality of entries, wherein ones of the plurality of entries store information corresponding to one of a plurality of known objects. Additionally, the method includes determining the dimensions of the object. Upon generating an initial classification of an object, a confidence metric is generated for a classification of a particular one of the one or more anomalies, the confidence metric indicating a degree of confidence that the classification is correct.

Generating the three-dimensional map includes performing calculations on the earth's surface data and determining the presence of surface features including natural features and man-made features. As additional data is received over time, embodiments of the method include detecting shifting landscapes based on the three-dimensional data. Furthermore, the method may include detecting a presence of one or more hidden objects within surfaces detected to be shifting.

In various embodiments of a system for carrying out the method, the collectors include one or more satellites (e.g., a constellation of earth-orbiting satellites). The collectors may in some embodiments also (or alternatively) include one or more aerial vehicles.

From time to time, additional data may be received by the computer system. Accordingly, the method when carried out by such a computer system may include updating the baseline three-dimensional map based on receiving additional data from the one or more collectors.

Figure 5:
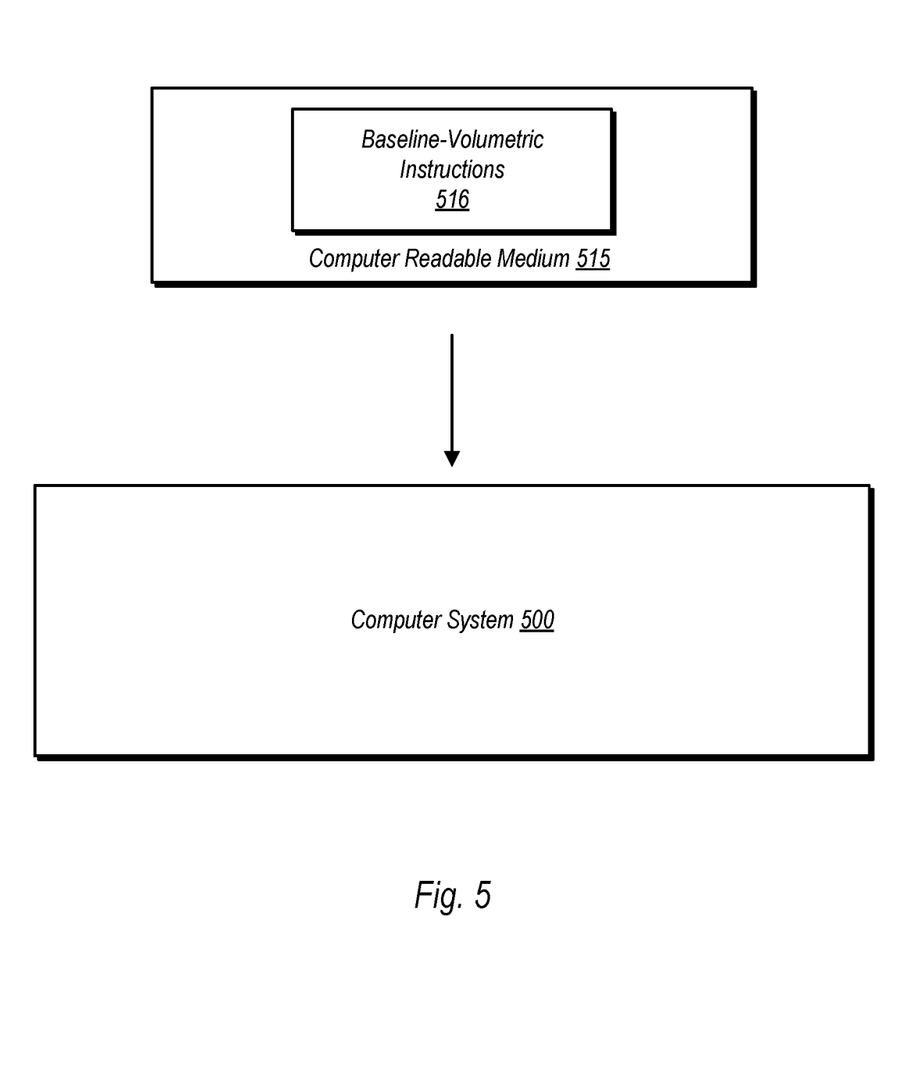
FIG. 5 is a block diagram of one embodiment of a computer system and a computer readable medium.

Computer System:

FIG. 5 is a block diagram of one embodiment of a computer system and a computer readable medium. Computer system 500 in the embodiment shown may be any type of computer system capable of carrying out the various operations described above with reference to FIGS. 1-4. Computer readable medium 515 in the embodiment shown may be any type of non-transitory medium capable of providing persistent storage of information, including data and instructions, and capable of being read by a computer system. Accordingly, computer readable medium 515 may be implemented using various types of storage/memory mechanisms, such as flash memory, disk storage, various types of random access memory, and so on. The computer readable medium 515 may be implemented as part of computer system 500 in some embodiments, but is also contemplated as being peripheral thereto in other embodiments.

In the embodiment shown, computer readable medium is shown storing baseline-volumetric instructions 516, which may include any of the various modules discussed above and/or any instructions executable to carry out the methods discussed above. The baseline-volumetric instructions 516 may also include therein various data structures, such as a library of objects, that are used in carrying out functions such as classification of anomalies/objects.

Although only a single instance of computer system 500 is shown here, embodiments utilizing multiple instances of a computer system to carry out the various operations described herein are also possible and contemplated. For example, a computer system executing the various modules of FIG. 2 may be utilized in conjunction with another computer system executing the various modules of FIG. 3 to carry out the disclosed operations.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Numerous variations and modifications will become apparent to those skilled in the art once the above disclosure is fully appreciated. It is intended that the following claims be interpreted to embrace all such variations and modifications.

What is claimed is:

1. A system comprising:
a computer system configured to:
receive earth's surface data from one or more collectors, wherein the earth's surface data comprises three-dimensional data generated from radio frequency signals reflected from the earth's surface;
generate an initial version of a baseline three-dimensional map of earth's surface, wherein generating the three-dimensional map includes determining, based on the surface data, a presence of surface features in the earth's surface;
based on a comparison of the baseline to subsequently received data, determine a presence of one or more anomalies on the earth's surface;
determine that a first anomaly of the one or more anomalies matches an object having an object type; and
create a data structure, in response to the determining, that indicates an object type and a geographic location of the matched object, wherein the geographic location is usable to track the matched object during an analysis period.

2. The system of claim 1, wherein, in generating the three-dimensional map, the computer system is configured to perform calculations on the earth's surface data and determining, within the surface features, a presence natural features and a presence of man-made features.

3. The system of claim 1, wherein the computer system is configured to determine the object type of the object by matching the data with an entry in an object library having a plurality of entries, wherein ones of the plurality of entries store information corresponding to one of a plurality of known objects.

4. The system of claim 1, further comprising updating the baseline three-dimensional map based on receiving additional data from the one or more collectors.

5. The system of claim 1, further comprising at least one satellite operating as one of the one or more collectors.

6. The system of claim 1, further comprising at least one aerial vehicle operating as one of the one or more collectors.

7. The system of claim 1, wherein the computer system is configured to generate a confidence metric in a classification of a particular one of the one or more anomalies, the confidence metric indicating a degree of confidence that the classification is correct.

8. The system of claim 1, wherein the computer system is configured to execute a machine learning model to determine a match between the object and the object type.

9. A method, comprising:
receiving, at a computer system, earth's surface data from one or more collectors, wherein the earth's surface data comprises three-dimensional data generated from radio frequency signals reflected from the earth's surface;
generating, using the computer system, an initial version of a baseline three-dimensional map of earth's surface;
subsequent to generating the initial version of the baseline three-dimensional map of earth's surface, determining a presence of one or more anomalies on the earth's surface based on a comparison of subsequently received data and the initial version of the baseline;
determining, by the computer system, that a first one of the one or more anomalies matches an object having an object type; and in response to the determining, creating, by the computer system, a data structure that indicates the object type and a geographic location of the matched object, wherein the geographic location is usable to track the matched object during an analysis period.

10. The method of claim 9, further comprising determining the object type of the object by matching the data with an entry in an object library having a plurality of entries, wherein ones of the plurality of entries store information corresponding to one of a plurality of known objects.

11. The method of claim 9, wherein generating the three-dimensional map includes performing calculations on the earth's surface data and determining the presence of surface features including natural features and man-made features.

12. The method of claim 9, further comprising determining the dimensions of the object.

13. The method of claim 9, further comprising generating a confidence metric in a classification of a particular one of the one or more anomalies, the confidence metric indicating a degree of confidence that the classification is correct.

14. The method of claim 9, further comprising detecting shifting landscapes based on the three-dimensional data.

15. The method of claim 9, further comprising detecting a presence of one or more hidden objects within surfaces detected to be shifting.

16. The method of claim 9, wherein the collectors include one or more satellites.

17. The method of claim 9, further comprising updating the baseline three-dimensional map based on receiving additional data from the one or more collectors.

18. A non-transitory computer readable medium storing instructions that, when executed by a computer system, causes the computer system to perform the following operations:
generate an initial version of a baseline three-dimensional map of earth's surface based on earth's surface data received from one or more collectors, wherein the earth's surface data includes three-dimensional data generated from radio frequency signals from the earth's surface;
determine a presence of surface features in the surface data, the surface features including natural and man-made features;
based on a comparison of the baseline to subsequently received data, detect a presence of one or more anomalies on the earth's surface;
determine that a first anomaly of one or more anomalies in the baseline matches an object having an object type; and
create a data structure indicating the object type and geographic location data of the matched object, wherein the geographic location data is usable to track the matched object during an analysis period, wherein tracking the matched object includes tracking movement of the matched object.

19. The computer readable medium of claim 18, further comprising instructions executable to:
match data of the object with an entry in an object library having a plurality of entries, wherein ones of the plurality of entries store information corresponding to one of a plurality of known objects; and
generate a confidence metric in a classification of the object, the confidence metric indicating a degree of confidence that the classification is correct.

20. The computer readable medium of claim 18, further comprising instructions executable to:

detect shifting landscapes based on the three-dimensional data; and detect a presence of one or more hidden objects within surfaces detected to be shifting.

* * * * *